United States Patent [19]
Juretzek et al.

[11] Patent Number: 4,466,330
[45] Date of Patent: Aug. 21, 1984

[54] DISINTEGRATING, DENSELY FILLED POLYAMIDE MOLDING COMPOSITION

[75] Inventors: Heinz Juretzek, Münster; Wolfgang Kriesten, Marl; Paul Sindermann, Nuremberg, all of Fed. Rep. of Germany

[73] Assignee: Chemische Werke Hüls AG, Marl, Fed. Rep. of Germany

[21] Appl. No.: 399,123

[22] Filed: Jul. 16, 1982

[30] Foreign Application Priority Data

Aug. 1, 1981 [DE] Fed. Rep. of Germany ....... 3130569

[51] Int. Cl.³ .................... C06D 1/08; F42B 3/00
[52] U.S. Cl. .................... 86/20 R; 86/1 R; 102/529; 524/439

[58] Field of Search ............... 524/439, 602; 86/1 R, 86/20 R, 20 B; 102/529

[56] References Cited

U.S. PATENT DOCUMENTS 3,598,864  8/1971  Caldwell et al. .................... 524/602
4,097,445  6/1978  Martins et al. ...................... 524/439

FOREIGN PATENT DOCUMENTS 784985  5/1968  Canada ............................. 102/529

Primary Examiner—Leland A. Sebastian
Attorney, Agent, or Firm—Wells & Wells

[57] ABSTRACT

A polyamide molding composition filled with fine particulate metals for injection molding into practice hand grenades and shells which disintegrate into small pieces.

12 Claims, 2 Drawing Figures

DISINTEGRATING, DENSELY FILLED POLYAMIDE MOLDING COMPOSITION

BACKGROUND OF THE INVENTION

The field of the invention is polyamide compositions containing particulate metal fillers and the invention is particularly concerned with the application of these compositions to injection molded practice hand grenades and shells.

The state of the art of producing polyamide compositions containing fillers and processing these compositions by injection molding may be ascertained by reference to the Kirk-Othmer, "Encyclopedia of Chemical Technology", 2nd Edition, Vol. 16 (1968) under the section "Polyamides (Plastics)," pages 88–105, particularly page 92—polylauryllactam (nylon-12), pages 98-9-9—injection molding and extrusion and pages 101-10-2—Powder Processing, the disclosures of which are incorporated herein along with U.S. Pat. No. 3,317,482 which shows the state of the art of polylauryllactam production.

The state of the art of practice hand grenades and shells comprising metal powder filled compositions may be ascertained by reference to U.S. Pat. Nos. 3,194,161; 3,369,486 and 3,463,047 the disclosures of which are incorporated herein.

According to the present invention a molding composition is provided which is densely filled with fine particulate metals and which can be worked into molded articles by injection molding. Such molded articles should be dimensionally stable under ordinary conditions, that is, they should not break, for instance when being dropped, while on the other hand they should disintegrate when subjected to a high force, for instance to an explosive, into the finest possible particles which practically can no longer be located a few meters from the disintegration site. In particular the molding composition should be practical in the preparation of training hand grenades or mortar shells. For those applications, the molded article must be of a weight corresponding to that of a well defined grenade or shell.

It is known to arrange the effectively disintegrating metal particles inside such ammunition in a thermoplastic such as polystyrene of low impact strength. As regards the previously known procedures, the metal splinters have been enclosed with a liquid plastic within a hollow mold, and then with the shell casing, by injection molding if desired.

This laborious procedure has been required so far because the known thermoplastics cannot be processed into densely filled molding compositions.

SUMMARY OF THE INVENTION

Having in mind the limitations of the prior art it is an object of the present invention to provide a composition which is filled with fine particulate metals, processable by injection molding machines, and which disintegrates into minute particles, this polyamide molding composition comprising:

5 to 20% by weight of polyauryllactam having a relative viscosity of about 1.6 to 2.2 (German Industrial Standard DIN 53 727); and
80 to 95% by weight of fine particulate metals.

DESCRIPTION OF THE PREFERRED EMBODIMENTS

Figure 1:
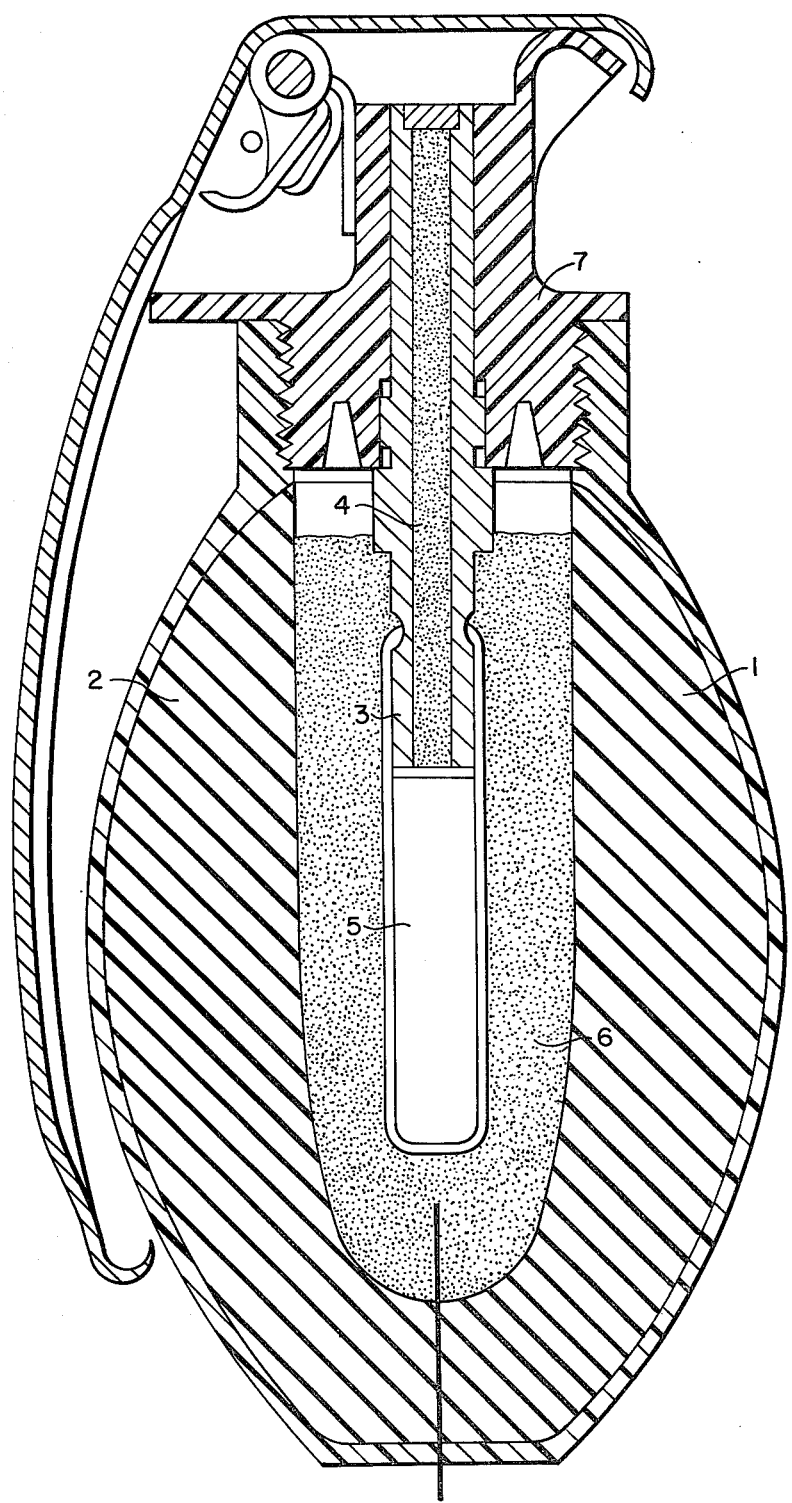
FIG. 1 of the drawing is an elevated view in cross-section of a practice hand grenade with the injection molded composition of the present invention and FIG. 2 is a practice mortar shell of the present invention.

In FIG. 1 injection molded half body 1 is shown on the right and injection molded half body 2 is shown on the left. This hand grenade has a metal tube 3, a delay 4, a detanator 5, an explosive charge 6, and an ignition body 7.

Figure 2:
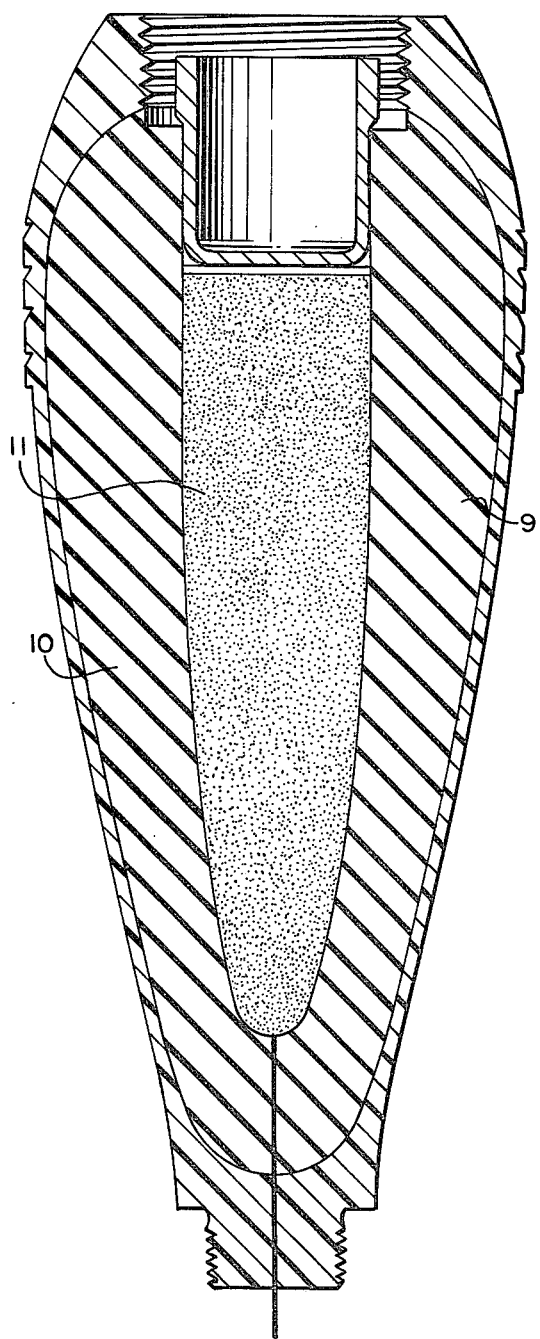

The practice mortar shell of FIG. 2 has injection molded half body 9 on the right, injection molded half body 10 on the left, and explosive charge 11 in the center.

A suitable polylauryllactam is produced by hydrolytic polymerization as disclosed in U.S. Pat. Nos. 3,799,899 and 3,317,482. Polylauryllactam obtained by anionic polymerization in the presence of metal fillers is too brittle and does not splinter into the required small particles. The relative visosity as measured by German Industrial Standard DIN 53 727 is between 1.6 and 2.2, especially between 1.6 and 1.8. The proportion of polylauryllactam in the molding composition is especially 5 to 15% by weight. Suitable fine-particulate metals are copper, bronze in the form of very fine powders or fragments of a size of less than 100 microns and approximately equal to 0.100 mm. In particular the metal proportion of the molding composition is between 85 and 95% by weight.

The ingredients are processable on kneaders into the molding composition, the polylauryllactam being prepared if desired in the form of granulates or as a powder.

Obviously dyes, lubricants, stabilizers and other accessories if desired are added to the molding compositions in conventional amounts as disclosed in Kirk-Othmer i.b.i.d.

Despite its high metal content the molding composition can be processed by injection molding machinery into molded articles. Obviously the molding composition can also be processed into other molded articles besides fillers for hand grenades or mortar shells. In many instances these compositions possess sufficient impact strength, for instance they are suited for the manufacture of sound absorbing plates. The density of the metal filled molded compositions amounts to 3.5 to 4.9 g/cm$^3$, especially 4.2 to 4.5 g/cm$^3$.

SPECIFIC EXAMPLE 13 parts by weight of polylauryllactam (relative viscosity 1.65) and 87 parts by weight of bronze fragments of a size of less than 100 microns are kneaded. The molding composition received in the form of granulates is processed by injection molding into two half bodies of a training hand grenade (FIG. 1).

We claim:

1. A polyamide molding composition densely filled with fine particulate metals for injection molding into molded articles which disintegrate into small particles, comprising:
   (a) 5 to 20% by weight of polylauryllactam having a relative viscosity between 1.6 to 2.2 as determined by German Industrial Standard DIN 53 727; and (b) 80 to 95% by weight of fine particulate metals.

2. The composition of claim 1, wherein said fine particulate metals have a size less than 100 microns.

3. The composition of claim 2, wherein (a) is 5 to 15% by weight and (b) is 85 to 95% by weight.

4. A method of producing a densely filled molded article which disintegrates into small particles, comprising:
   (a) mixing 5 to 20% by weight molten polylauryllactam having a relative viscosity between 1.6 to 2.2 as determined by German Industrial Standard DIN 53 727 with;
   (b) 80 to 95% by weight of fine particulate metals to form a densely filled molding composition; and
   (c) injection molding said composition into said molded article which disintegrates into small particles.

5. The method of claim 4, wherein said molded article has a density of about 3.5 to 4.9 grams per cubic meter.

6. The method of claim 5, wherein said fine particulate metals have a size less than 100 microns.

7. The method of claim 6, wherein said molded article is a practice hand grenade.

8. The method of claim 7, wherein said molded article is a practice mortar shell.

9. The method of claim 7, wherein said hand grenade has a density of about 4.2 to 4.5 grams per cubic meter.

10. The method of claim 8, wherein said mortar shell has a density of about 4.2 to 4.5 grams per cubic meter.

11. The method of claim 7, wherein said practice hand grenade is injection molded into two half bodies.

12. The method of claim 8, wherein said practice mortar shell is injection molded into two half bodies.

* * * * *